Oct. 7, 1941.  A. VON FALKENHAUSEN  2,258,397
SIDE CAR MOTORCYCLE
Filed Jan. 17, 1940
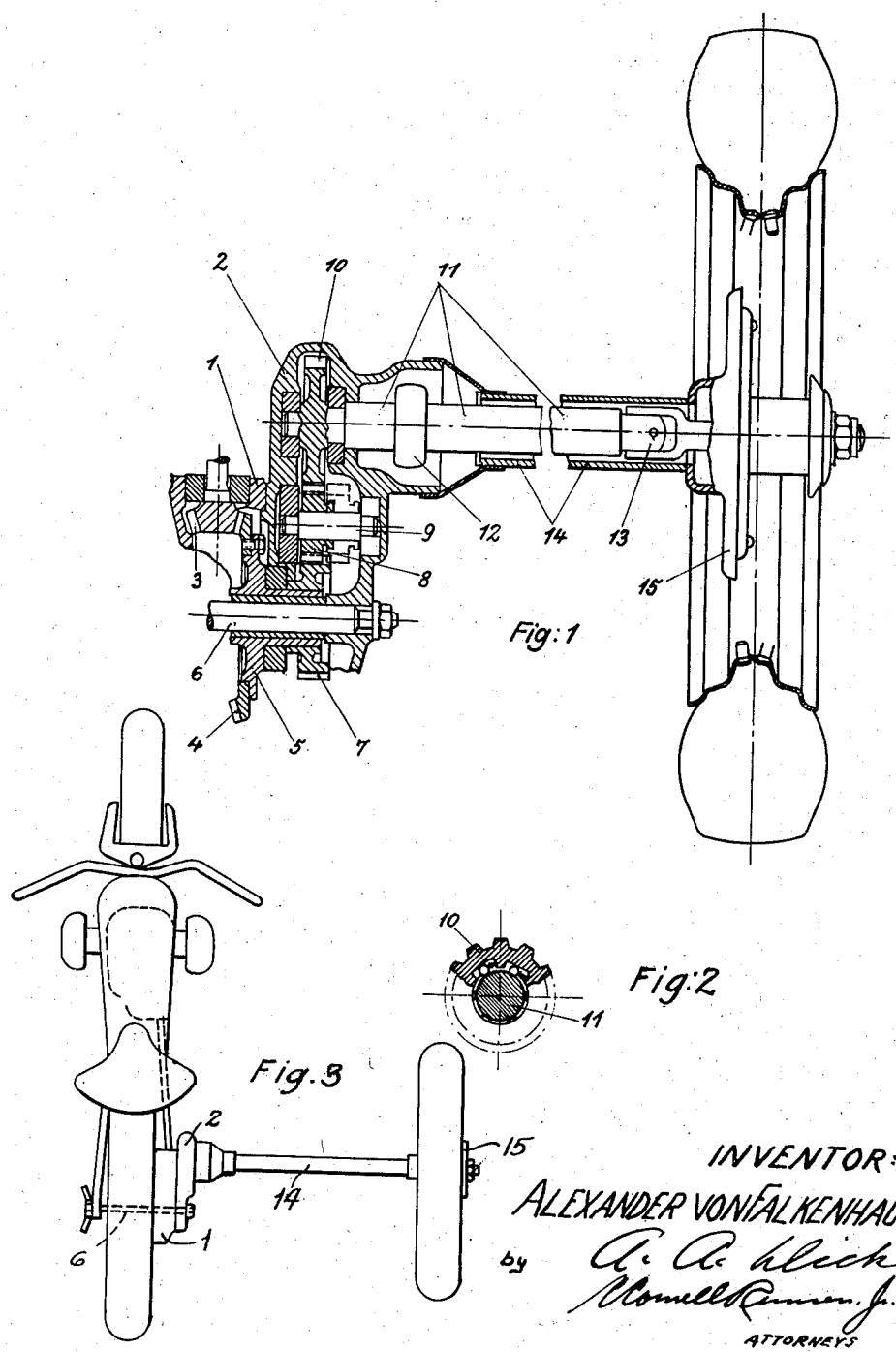
INVENTOR:
ALEXANDER VON FALKENHAUSEN
ATTORNEYS Patented Oct. 7, 1941

2,258,397

UNITED STATES PATENT OFFICE 2,258,397

SIDE CAR MOTORCYCLE

Alexander von Falkenhausen, Munich, Germany, assignor to Bayerische Motoren Werke Aktiengesellschaft, Munich, Germany, a company of Germany Application January 17, 1940, Serial No. 314,230
In Germany February 11, 1939

11 Claims. (Cl. 180—27)

When driving on difficult ground, on slippery roads, of steep gradients and the like it is of great advantage to use the side car wheel for the power transmission.

The idea to convert the side car wheel into a driving wheel is not new and some forms of construction are already known, which however mostly represent provisory solutions of the problem in connection with motor cycles with chain drive of the rear wheel.

An object of this invention is to provide an improved arrangement designed particularly for the driving of the side car wheel of a motorcycle.

Another object of this invention is to drive a side car wheel of a motorcycle, positioned forwardly of the rear motorcycle wheel, the drive shaft for the side car wheel being parallel to the rear wheel axle.

A further object of this invention is to provide a drive for the side car of a motorcycle, wherein the drive shaft for the side wheel is protected and covered by a tubular frame member of the side car.

An additional object of this invention is to provide a readily controllable free wheel drive for the side car wheel of a motorcycle.

With the foregoing and other objects in view which will appear as the description proceeds, the invention resides in the combination and arrangement of parts and in the details of construction hereinafter described and claimed.

The invention has been illustrated in its preferred embodiment in the accompanying drawing wherein:

Fig. 1 is a horizontal transverse cross-sectional view of an improved drive for the side car wheel of a motorcycle, in accordance with the principles of the present invention;

Fig. 2 is a cross-sectional view of the overrunning clutch used in the transmission illustrated in Fig. 1; and Fig. 3 is a top plan view of a motorcycle, with side car removed, illustrating the arrangement of the side car wheel drive in accordance with the invention, relatively to the motorcycle as a whole.

The casing 2 of the transmission gearing is flanged to the rear wheel drive housing 1. The engine torque is transmitted by the shaft drive through the bevel pinion 3 to the crown wheel 4. Rigidly bolted to the crown wheel 4 is the clutch shaft 5 which drives the rear wheel in a known manner. The rear wheel axle 6 does not rotate. The other end of the clutch shaft 5 carries a gear wheel 7 rigidly secured thereto and in positive engagement through the intermediate gear 8 with the gear wheel 10 which on its part is rigidly secured to the side wheel driving shaft 11. The intermediate gear 8 in the transmission gearing is slidably mounted on its shaft 9. The other possible position of the intermediate gear is shown in broken lines. In this case the connection with the side car wheel is interrupted.

The side wheel driving shaft is provided by way of example with two articulated joints 12 and 13.

14 designates a transverse tube of the side car frame and 15 the side car wheel, which in known manner is rigidly secured to the side wheel driving shaft.

Fig. 2 shows diagrammatically the arrangement of an automatic overrunning clutch of the jamming roller pattern, which e. g. is fitted in the gear wheel 10 on the side car wheel driving shaft 11.

It will be noted that in the present invention it is contemplated that the side car driving wheel is positioned forwardly of the rear motorcycle wheel. This is known to bring about improved power distribution and superior riding characteristics of the vehicle as a whole, but in accordance with my construction I have eliminated the obliquely extending drive shaft characteristics of prior constructions.

It is also to be noted that the entire transmission for the side car wheel is enclosed so that it is fully protected from mud and water as well as from mechanical damage. No exposed rotating parts are provided since the drive shaft for the drive car wheel can be enclosed in the tubular frame member 14 of the side car. This also results in favorable clearance of the drive shaft, a feature which is important if the motorcycle is traveling over bumpy and uneven terrain.

The invention in the present case not only simply and easily embodies an arrangement for connecting or disconnecting the side car wheel from the transmission, an important feature since the side car drive should only be used on rough ground, but additionally an automatic overrunning clutch to provide free wheeling has been included. With this automatic clutch it only takes a slight dragging on the part of the rear wheel to effect a positive drive of the side car wheel, so that if extra power is needed it will automatically be applied. The free wheeling device also permits a more ready shifting of the side car connecting gear, which can be maintained in positive engagement with the rear wheel drive.

Another feature of the present invention lies in the fact that the entire transmission gearing for the side car drive together with the free wheeling system represents a self-contained structural unit which is easily added to the motorcycle merely by replacing the rear wheel axle with the clutch shaft.

It will be noted that the construction shown and described will serve admirably to accomplish the objects stated above. It is to be understood, however, that the construction disclosed above is intended merely as illustrative of the invention and not as limiting as various modifications may be made without departing from the invention as defined by a proper interpretation of the claims which follow.

I claim:

1. In a motorcycle, a frame, a rear axle rigidly connected to said frame, a rear wheel rotatably mounted on said axle, a driving gear rotatably mounted on said axle in engagement with said rear wheel, a gear wheel rotatable with said drive gear, a side wheel mounted forwardly and laterally of said rear wheel, a drive shaft for said side wheel, and a shiftable transmission gearing for drivably connecting or disconnecting said drive shaft with said gear wheel.

2. The combination according to claim 1, in which said driving gear is formed with a hub extension upon which said gear wheel is mounted and attached.

3. The combination according to claim 1, in which said drive shaft is parallel to said rear axle.

4. The combination according to claim 1, in which said transmission gearing includes a second gear wheel on the end of said drive shaft, and an axially shiftable intermediate gear wheel for interconnecting said first and second gear wheels in its engaging position, said intermediate gears wheel remaining in engagement with one of said gear wheels in its disconnecting position.

5. The combination according to claim 1, in which said transmission gearing includes an over-running clutch to permit free-wheeling of said side wheel.

6. The combination according to claim 1, in combination with a propeller shaft and pinion for driving said driving gear, one housing for said propeller shaft and pinion, another housing for said transmission gearing flanged to said one housing, and a transverse tubular frame member supported from said other housing and enclosing said drive shaft.

7. The combination according to claim 1, in which said drive shaft is articulated to permit relative up and down movement between said side wheel and said rear wheel.

8. The combination according to claim 1, in which said transmission gearing includes a second gear wheel on the end of said drive shaft and an axially shiftable intermediate gear wheel for interconnecting said first and second gear wheels in its engaging position, said first and second gear wheels having such a difference in width that in its disengaging position said intermediate gear wheel will remain in engagement with one of them.

9. The combination according to claim 1, in in which said transmission gearing includes a second gear wheel on the end of said drive shaft and an axially shiftable intermediate gear wheel for interconnecting said first and second gear wheels in its engaging position, said second gear wheel including an overrunning clutch for engagement with said drive shaft.

10. In a motorcycle, a frame, a rear wheel, means for rotatably mounting said rear wheel on said frame, a side wheel mounted forwardly and laterally of said rear wheel, means for driving said rear wheel, and means for driving said side wheel through said last means, including an over-running clutch to permit free-wheeling of said side wheel.

11. The combination according to claim 10, in which the axes of said rear and side wheels lie in parallel transverse planes.

ALEXANDER v. FALKENHAUSEN.